US012647428B1

(12) United States Patent
Arikatla et al.

(10) Patent No.:   US 12,647,428 B1
(45) Date of Patent:       Jun. 2, 2026

(54) RESHARING DATA WITH OTHER ACCOUNTS

(71) Applicant: Snowflake Inc., Bozeman, MT (US)

(72) Inventors: Durga Mahesh Arikatla, San Jose, CA (US); Damien Carru, New York, NY (US); Anoosha Chanda, San Ramon, CA (US); David Menestrina, Los Altos, CA (US); Sanjay Srivastava, Mountain View, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 19/236,615

(22) Filed: Jun. 12, 2025

(51) Int. Cl.
  *H04L 9/40*         (2022.01)
(52) U.S. Cl.
  CPC .................................. *H04L 63/105* (2013.01)
(58) Field of Classification Search
  CPC ...................................................... H04L 63/10
  See application file for complete search history.

(56)             References Cited

U.S. PATENT DOCUMENTS

| | | | | |
|---|---|---|---|---|
| 9,774,495 | B1* | 9/2017 | Okita | .................. H04L 41/0803 |
| 9,870,238 | B2* | 1/2018 | Astete | ..................... H04L 63/10 |
| 2018/0213033 | A1* | 7/2018 | Subbian | ............... H04L 67/306 |
| 2022/0159007 | A1* | 5/2022 | Dageville | ............. H04L 63/102 |

OTHER PUBLICATIONS

Multi-tenant Database Access Control, Yaish et al, Dec. 2013 (Year: 2013).*

* cited by examiner

*Primary Examiner* — Jahangir Kabir
(74) *Attorney, Agent, or Firm* — Schwegman Lundberg & Woessner, P.A.

(57)             ABSTRACT

Techniques for resharing data in multi-tenant data system includes receiving, by a resharer account, a first listing for a first set of data shared by a provider account of the multi-tenant data system, the listing defining an access grant and a resharing grant for the first set of data. The resharer account creates a first database in the resharer account, the first database comprising virtual representations of the first set of data. The resharer account transforms the first set of data to generate a second set of data and stores the second set of data in a second database in the resharer account, the second set of data comprising at least one virtual representation of the first set of data. The resharer account publishes a second listing of the second set of data to share with a consumer account based on the resharing grant for the first set of data in the first listing.

20 Claims, 11 Drawing Sheets

600

602

Import shared data from provider account

604

Enrich or transform the shared data

606

Create new share object for enriched data

608

Publish listing for new share object

RESHARING DATA WITH OTHER ACCOUNTS

TECHNICAL FIELD

Embodiments of the disclosure relate generally to cloud data platforms and, more specifically, to multi-tenant data platforms with data sharing and resharing capabilities.

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

Data platforms may be shared by multiple accounts in a multi-tenant configuration. In some instances, different organizations, persons, or companies may wish to share database data. For example, an organization may have valuable information stored in a database that could be marketed or sold to third parties. The organization may wish to enable third parties to view the data, search the data, and/or run reports on the data.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
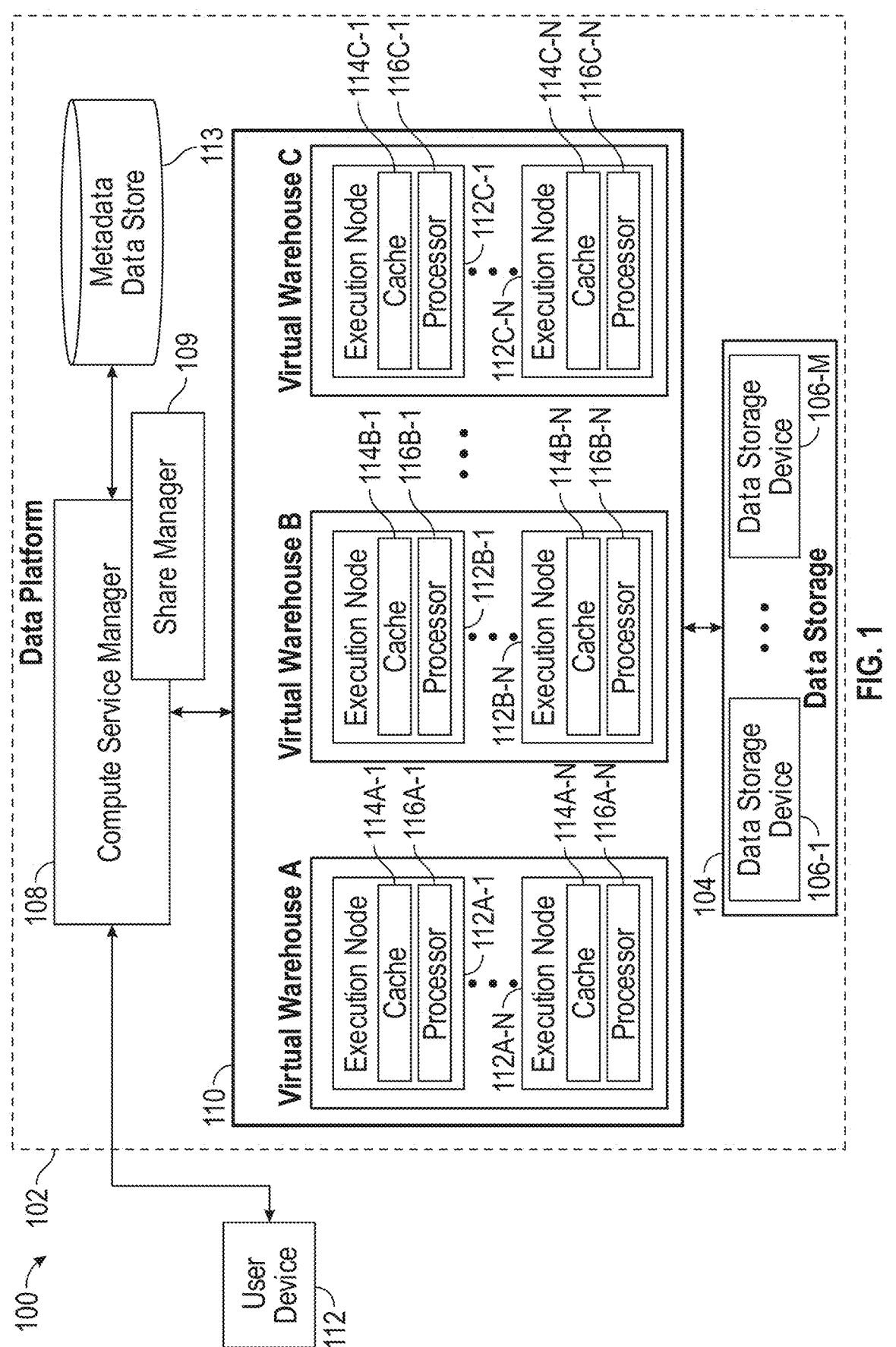
FIG. 1 illustrates an example computing environment that includes a cloud data platform, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

A database system may have multiple accounts or clients that each store unique sets of data within the database system. In some examples, the database system may store and manage data for multiple businesses and each of the multiple businesses may have its own account within the database system. It may be desirable to permit two or more different accounts to share data. Data may be shared between a provider account that owns the data and a receiver account that receives access to the data. In some instances, the receiver account may want to reshare the shared data with other accounts.

Conventional data sharing techniques often encounter limitations in resharing data across accounts. Specifically, once data is shared, consumers frequently transform, enrich, or apply access controls to the incoming datasets before sharing them further. Current approaches, such as creating materialized copies of the data, are operationally complex, costly, and prone to errors. These approaches also introduce notable latency and governance challenges, particularly when handling large-scale datasets. Consequently, organizations face obstacles in maximizing the potential of shared data, restricting their ability to customize datasets to address the needs of downstream consumers or value-added resharers (VARs).

Systems, methods, and devices disclosed herein enable data sharing and resharing between accounts of a multi-tenant cloud platforms, such as database system. The resharing techniques disclosed herein employ a seamless and efficient mechanism for resharing data within multi-tenant cloud platforms. The solution enables consumers of shared datasets to reshare incoming data without materializing the data within the same deployment, thereby eliminating operational complexity and reducing costs. Providers can maintain control of the data in the resharing process to explicitly allow and disallow resharing of their data. Using the techniques described herein, resharing can continue to operate even when the original provider alters the data. Moreover, multi-level sharing is enabled allowing reshared listings to use other reshared listings.

In some examples, secure views are used in the resharing techniques, which allow resharers to reference incoming datasets, apply transformations, and enforce data governance policies without exposing the underlying data or schema. Secure views can ensure that resharing adheres to data privacy and grant settings of the original provider, while also allowing resharers to enrich the data.

Additionally, the techniques described herein incorporate mechanisms to monitor the data during the resharing activities. For example, the mechanisms can notify resharers when reshared listings are disrupted due to changes in the governance policies or resharing permissions of the original provider. The techniques also provide visibility into resharing activities, allowing providers to track the number of downstream reshares and enforce restrictions on resharing permissions. This ensures that providers retain control over their data and enforcing their data governance and compliance standards while enabling VARs to create enriched datasets for their downstream customers.

FIG. 1 illustrates an example computing environment 100 that includes a cloud data platform 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the cloud data platform 102 comprises a three-tier architecture: a compute service manager 108 coupled to a metadata data store 113, an execution platform 110, and data storage 104. The cloud data platform 102 hosts and provides data access, management, reporting, and analysis services to multiple client accounts. Administrative users can create and manage identities (e.g., users, roles, and groups) and use permissions to allow or deny access to the identities to resources and services. The cloud data platform 102 is used for reporting and analysis of integrated data from one or more disparate sources including storage devices within the data storage 104. The data storage 104 comprises a plurality of computing machines and provides on-demand computer system resources such as data storage and computing power to the cloud data platform 102.

The compute service manager 108 includes multiple services that coordinate and manage operations of the cloud data platform 102. For example, the compute service manager 108 is responsible for performing query optimization and compilation as well as managing clusters of compute nodes that perform query processing (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also coupled to the metadata data store 113. The metadata data store 113 stores metadata pertaining to various functions and aspects associated with the cloud data platform 102 and its users. The metadata data store 113 also includes a summary of data stored in data storage 104 as well as data available from local caches. Additionally, the metadata data store 113 includes information regarding how data is organized in the data storage 104 and the local caches.

As shown, the compute service manager 108 includes a share manager 109 (also referred to as access management) that is responsible for sharing and resharing data across accounts. Further details of the operation of the share manager 109 are discussed below.

The compute service manager 108 is also in communication with a user device 112. The user device 112 corresponds to a user of one of the multiple client accounts supported by the cloud data platform 102. In some implementations, the compute service manager 108 does not receive any direct communications from the user device 112 and only receives communications concerning jobs from a queue within the cloud data platform 102.

The compute service manager 108 is also coupled to the metadata data store 113. The metadata data store 113 stores metadata pertaining to various functions and aspects associated with the cloud data platform 102 and its users. The metadata data store 113 also includes a summary of data stored in data storage 104 as well as data available from local caches. Additionally, the metadata data store 113 includes information regarding how data is organized in the data storage 104 and the local caches.

The compute service manager 108 is further coupled to the execution platform 110, which includes multiple virtual warehouses (computing clusters) that execute various data storage and data retrieval tasks. As an example, a set of processes on a compute node executes at least a portion of a query plan compiled by the compute service manager 108. As shown, the execution platform 110 includes virtual warehouse A, virtual warehouse B, and virtual warehouse C. Each virtual warehouse includes multiple execution nodes that each includes a data cache and a processor. For example, as shown, virtual warehouse A includes execution nodes 112A-1 to 112A-N; execution node 112A-1 includes a cache 114A-1 and a processor 116A-1; and execution node 112A-N includes a cache 114A-N and a processor 116A-N. Similarly, in this example, virtual warehouse B includes execution nodes 112B-1 to 112B-N; execution node 112B-1 includes a cache 114B-1 and a processor 116B-1; and execution node 112B-N includes a cache 114B-N and a processor 116B-N. Additionally, virtual warehouse C includes execution nodes 112C-1 to 112C-N; execution node 112C-1 includes a cache 114C-1 and a processor 116C-1; and execution node 112C-N includes a cache 114C-N and a processor 116C-N.

Each execution node of the execution platform 110 is assigned to processing one or more data storage and/or data retrieval tasks. Hence, the virtual warehouses can execute multiple tasks in parallel utilizing the multiple execution nodes. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

In some examples, the execution nodes of the execution platform 110 are stateless with respect to the data the execution nodes are caching. That is, the execution nodes do not store or otherwise maintain state information about the execution node or the data being cached by a particular execution node, in these examples. Thus, in the event of an execution node failure, the failed node can be transparently replaced by another node. Since there is no state information associated with the failed execution node, the new (replacement) execution node can easily replace the failed node without concern for recreating a particular state.

The execution platform 110 may include any number of virtual warehouses. Additionally, the number of virtual warehouses in the execution platform 110 is dynamic, such that new virtual warehouses are created when additional processing and/or caching resources are needed. Similarly, existing virtual warehouses may be deleted when the resources associated with the virtual warehouse are no longer necessary.

Although each virtual warehouse shown in FIG. 1 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary. Additionally, although the execution nodes shown in the example of FIG. 1 each include a single data cache and a single processor, in other examples, execution nodes can contain any number of processors and any number of caches. Also, the caches may vary in size among the different execution nodes.

In some examples, the virtual warehouses of the execution platform 110 operate on the same data, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Although virtual warehouses A, B, and C are illustrated with an association with the same execution platform 110, the virtual warehouses may be implemented using multiple computing systems at multiple geographic locations. For example, virtual warehouse A can be implemented by a computing system at a first geographic location, while virtual warehouses B and C are implemented by another computing system at a second geographic location. In some examples, these different computing systems are cloud-based computing systems maintained by one or more different entities.

The execution platform 110 is coupled to data storage 104. The data storage 104 comprises multiple data storage devices 106-1 to 106-M. In some embodiments, the data storage devices 106-1 to 106-M are cloud-based storage devices located in one or more geographic locations. For example, the data storage devices 106-1 to 106-M may be part of a public cloud infrastructure or a private cloud infrastructure. The data storage devices 106-1 to 106-M may be hard disk drives (HDDs), solid state drives (SSDs), storage clusters, Amazon S3™ storage systems or any other data storage technology. Additionally, the data storage 104 may include distributed file systems (e.g., Hadoop Distributed File Systems (HDFS)), object storage systems, and the like. In some examples, the storage devices 106-1 to 106-M are managed and provided by a third-party data storage platform (e.g., AWS®, Microsoft Azure Blob Storage®, or Google Cloud Storage®).

Each virtual warehouse can access any of the data storage devices 106-1 to 106-M shown in FIG. 1. Thus, the virtual warehouses are not necessarily assigned to a specific data storage device 106-1 to 106-M and, instead, can access data from any of the data storage devices 106-1 to 106-M within the data storage 104. Similarly, each of the execution nodes shown in FIG. 1 can access data from any of the data storage devices 106-1 to 106-M. In some examples, a particular virtual warehouse or a particular execution node may be temporarily assigned to a specific data storage device, but the virtual warehouse or execution node may later access data from any other data storage device.

In some examples, communication links between elements of the computing environment 100 are implemented via one or more data communication networks. These data communication networks may utilize any communication protocol and any type of communication medium. In some examples, the data communication networks are a combination of two or more data communication networks (or sub-networks) coupled to one another.

As shown in FIG. 1, the data storage devices 106-1 to 106-M are decoupled from the computing resources associated with the execution platform 110. This architecture supports dynamic changes to the cloud data platform 102 based on the changing data storage/retrieval needs as well as the changing needs of the users and systems. The support of dynamic changes allows the cloud data platform 102 to scale quickly in response to changing demands on the systems and components within the cloud data platform 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

During typical operation, the cloud data platform 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more execution nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in the metadata data store 113 assists the compute service manager 108 in determining which nodes in the execution platform 110 have already cached at least a portion of the data needed to process the task. One or more nodes in the execution platform 110 process the task using data cached by the nodes and, if necessary, data retrieved from the data storage 104.

The compute service manager 108, metadata data store 113, execution platform 110, and data storage 104 are shown in FIG. 1 as individual discrete components. However, each of the compute service manager 108, metadata data store 113, execution platform 110, and data storage 104 may be implemented as a distributed system (e.g., distributed across multiple systems/platforms at multiple geographic locations). Additionally, each of the compute service manager 108, metadata data store 113, execution platform 110, and data storage 104 can be scaled up or down (independently of one another) depending on changes to the requests received and the changing needs of the cloud data platform 102. Thus, in the described embodiments, the cloud data platform 102 is dynamic and supports regular changes to meet the current data processing needs.

As shown in FIG. 1, the computing environment 100 separates the execution platform 110 from the data storage 104. In this arrangement, the processing resources and cache resources in the execution platform 110 operate independently of the data storage devices 106-1 to 106-M in the data storage 104. Thus, the computing resources and cache resources are not restricted to specific data storage devices 106-1 to 106-M. Instead, all computing resources and all cache resources may retrieve data from, and store data to, any of the data storage resources in the data storage 104.

Figure 2:
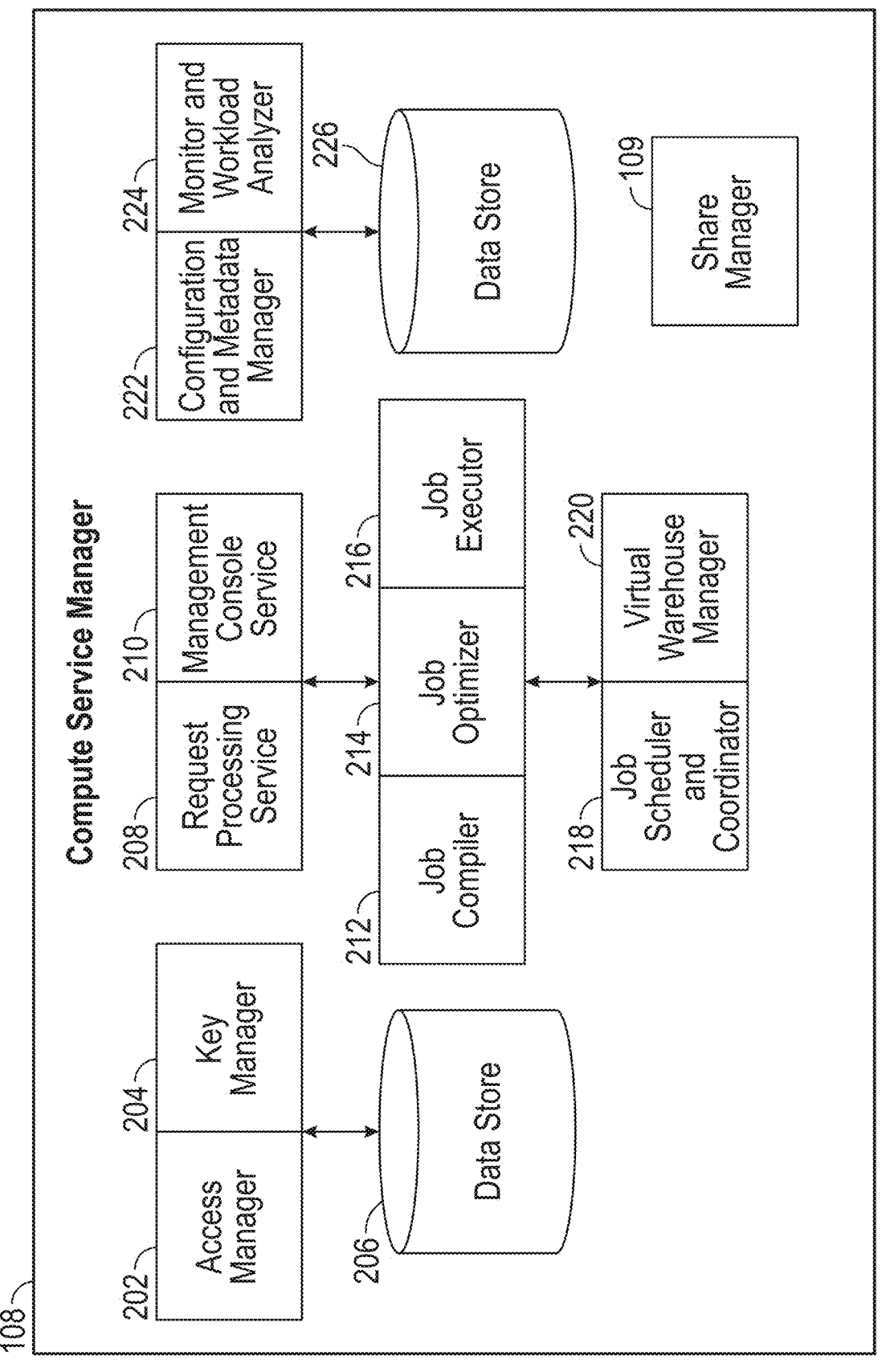
FIG. 2 is a block diagram illustrating components of a compute service manager of the cloud data platform, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a key manager 204 coupled to a data store 206 that stores access information. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in data storage 104).

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in data storage 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and processed in that prioritized order. In some examples, the job scheduler and coordinator 218 identifies or assigns particular nodes in the execution platform 110 to process particular tasks.

A virtual warehouse manager 220 manages the operation of multiple virtual warehouses implemented in the execution platform 110. As discussed below, each virtual warehouse includes multiple execution nodes that each include a cache and a processor.

Additionally, the compute service manager 108 includes a configuration and metadata manager 222, which manages the information related to the data stored in the remote data storage devices and in the local caches (e.g., the caches in execution platform 110). The configuration and metadata manager 222 uses the metadata to determine which storage units need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the cloud data platform 102 and may further redistribute tasks based on a user (e.g., "external") query workload that may also be processed by the execution platform 110. The configuration and metadata manager 222 and the monitor and workload analyzer 224 are coupled to a data store 226. Data store 226 in FIG. 2 represents any data repository or device within the cloud data platform 102. For example, data store 226 may represent caches in execution platform 110, storage devices in data storage 104, the metadata data store 113, or any other storage device or system.

In addition, as mentioned above, the compute service manager 108 includes the share manager 109 that is responsible for sharing and resharing data across accounts. Further details of the operation of the share manager 109 are discussed below.

Figure 3A:
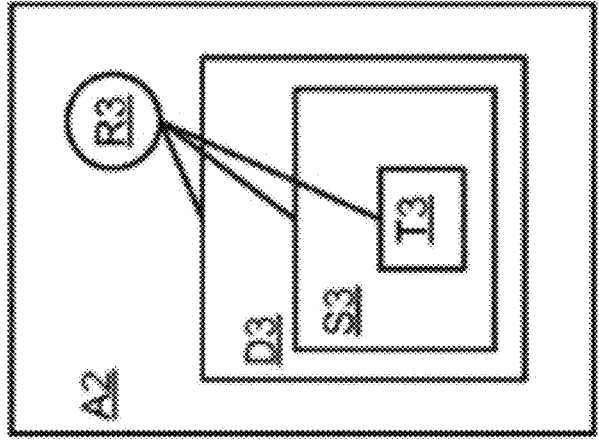
FIGS. 3A-3C show example data architectures for sharing database objects using the cloud data platform, in accordance with some embodiments of the present disclosure.
Figure 3A:
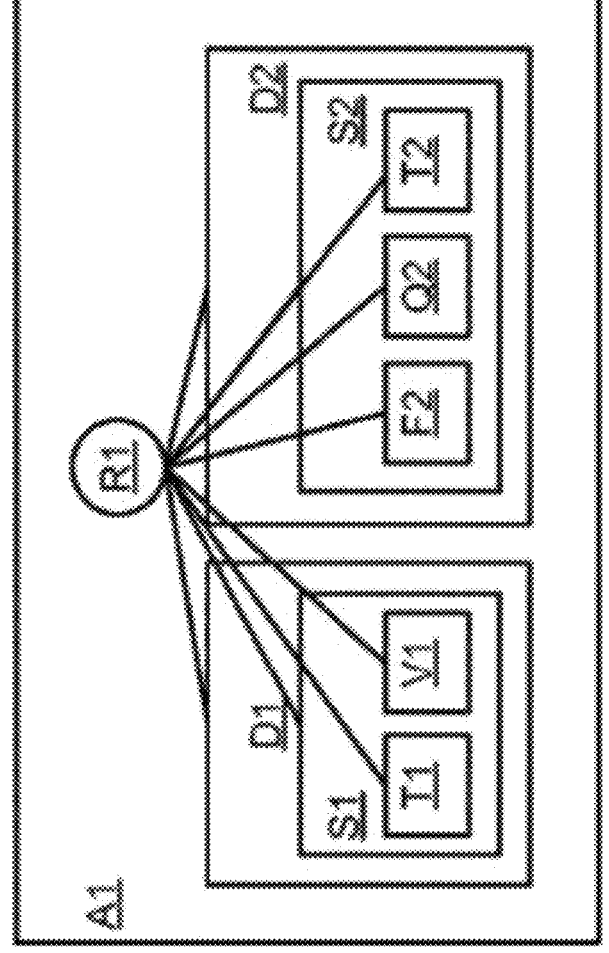
Figure 3B:
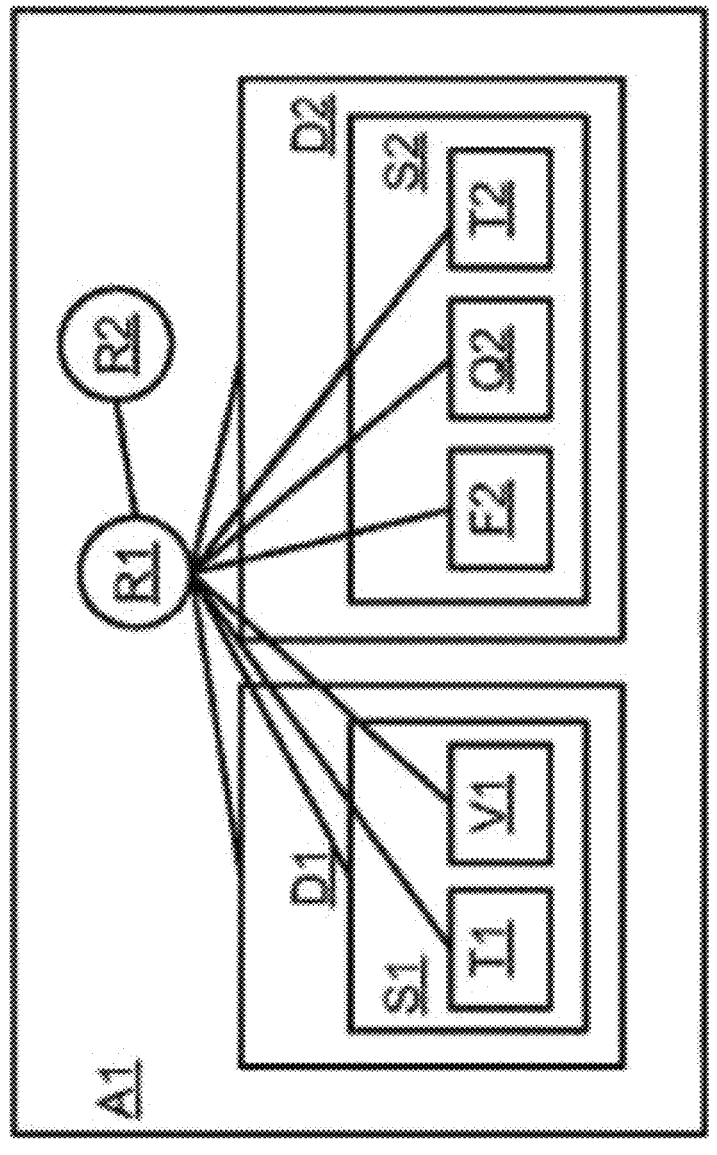
Figure 3C:
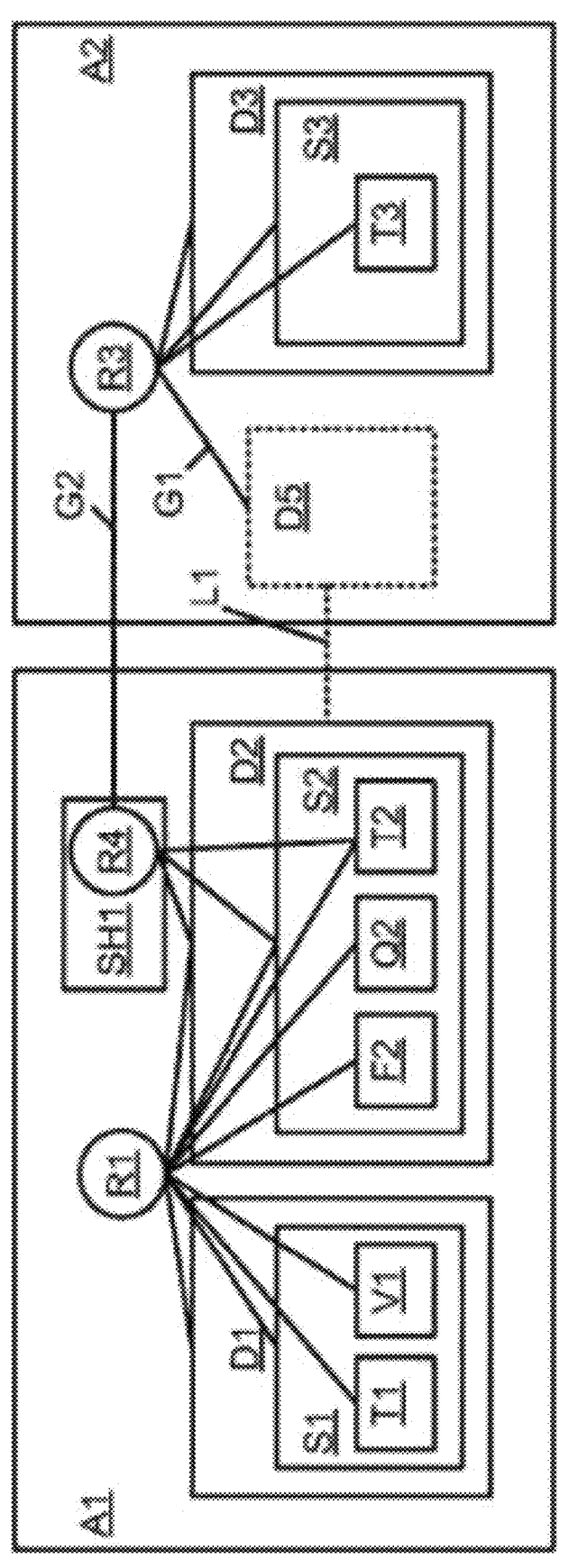

FIGS. 3A-3C show example data architectures for sharing database objects using the cloud data platform 102, according to some example embodiments. As discussed, share manager 109 can manage share data for sharing data between storage devices (e.g., different storage devices of a single account or sharing data in a storage device allocated to a first provider account to a second consumer account). In some example embodiments, share manager 109 implements role-based access control to govern access to objects in customer accounts. The role-based access control can include two mechanisms: roles and grants. In some embodiments, roles are special objects in an end-user account (e.g., provider account, consumer account) that are assigned to users. Grants between roles and database objects define what privileges a role has on these objects. For example, a role that has a usage privilege granted on a database can "see" this database when executing the command "show databases"; a role that has a select privileged grant on a table can read from this table but not write to the table. The role would need to have an update privilege or ownership privilege to modify the grant on the table to be able to write to it.

FIG. 3A is a schematic block diagram illustrating role-based access to objects in customer accounts of a multi-tenant shared database platform (e.g., cloud data platform 102), according to some example embodiments. In the following examples, a user account "A1" corresponds to a data provider account that manages a data provider virtual warehouse (e.g., virtual warehouse A in FIG. 1) and another different user account A2 corresponds to a data consumer account that initiates data consumer virtual warehouses (e.g., virtual warehouse B in FIG. 1).

As illustrated, the A1 account contains role R1, which has grants to all objects in the object hierarchy. Assuming these grants are usage grants between R1 and database objects D1 and D2, streams S1 and S2, and select grants between R1 and table object T1, view object V1, function object F2, sequence object Q2, table object T2, a user with activated role R1 can see all objects and read data from all tables, views, and sequences and can execute function F2 within account A1.

The account A2 contains role R3, which has grants to all objects in the object hierarchy. Assuming these grants are usage grants between R3 and D3, S3, and select a grant between R3 and T3, a user with activated role R3 can see all objects and read data from all tables, views, and sequences within account A2.

FIG. 3B illustrates a grant between roles. With role-based access control, it is also possible to grant usage from one role to another role. A role that has a usage grant to another role "inherits" all access privileges of the other role. For example, role R1 is granted to role R2 (in other words role R2 has a usage grant on role R1). A user (e.g., with corresponding authorization details) with activated role R2 can see and read from all objects because role R2 inherits all grants from role R1.

According to some embodiments, usage grants are granted across different accounts. An account that shares data may be referred to herein as a "sharer account" or "provider account" and an account with which the data is shared may be referred to herein as a "target account" or "consumer account". Some embodiments disclosed herein allow for instantaneous, zero-copy, easy-controllable cross-account sharing of data. In some embodiments, in order to share data with another account, a provider account may generate a share object. Within the share object, a role may be created, and a user of the provider account may indicate access rights or grants that are available to the role and/or foreign accounts (or consumer accounts) that will be granted rights under the role. A consumer account may then be able to identify share objects or roles in other accounts to which the target account has been granted rights or access. In some embodiments, share objects in a provider account may be imported into the provider account using alias objects and cross-account role grants.

The provider account creates a new type of object, the share object. The share object has a unique name to be identified within the provider account. For example, the name may need to be unique within an account, but not necessarily across accounts. Share objects may be created, modified, and deleted by referencing them via their name in the provider account.

In some examples, each share object contains a single role. Grants between this role and objects define what objects are being shared and with what privileges these objects are shared. The role and grants may be similar to any other role and grant system in the implementation of role-based access control. By modifying the set of grants attached to the role in a share objects, more objects may be shared (by adding grants to the role), fewer objects may be shared (by revoking grants from the role), or objects may be shared with different privileges (by changing the type of grant, for example to allow write access to a shared table object that was previously read-only).

In some embodiments, a share object also contains a list of references to consumer accounts. Only these consumer accounts that are specifically in the share object may be allowed to look up, access, and/or import from this share object. By modifying the list of references of other consumer accounts, the share object can be made accessible to more accounts or be restricted to fewer accounts.

FIG. 3C is a schematic block diagram illustrating logical grants and links between different accounts. A database alias object D5 is created in account A2. Database alias D5 references database D2 via link Ll. Role R3 has a usage grant G1 on database D5. Role R3 has a second usage grant G2 to role R4 in customer account A1. Using the share created, A2 is given access to data from A1. Role-based access control allows a user in account A2 with activated role R3 to access data in account A1. For example, if a user in account A2 wants to read data in table T2, role-based access control allows that because role R3 has a usage grant of role R4 and role R4, in turn, has a select grant on table T2. By way of illustration, a user with activated role R3 may access T2 by running a query or selection directed to "D5.S2.T2" (where access to T2 is through S2 and D5).

Using object aliases and cross-account object resolution through share in the target account to a role in the sharer account allows users in the target account to access information in the sharer account. In this way, a database system may enable sharing of data between different customer accounts in an instantaneous, zero-copy, easily controllable fashion. The sharing can be instantaneous because alias objects and cross-account grants can be created in milliseconds. The sharing can be zero-copy because no data has to be duplicated in the process. For example, all queries, or selections can be made directly to the shared object in the provider account without creating a duplicate in the consumer account. The sharing is also easy to control because it utilizes easy-to-use techniques of role-based access control. Additionally, in embodiments with separated storage and compute, there is no contention among computing resources when executing queries on shared data. Thus, different virtual warehouses in different customer accounts may individually process shared data. For example, a first virtual warehouse for a first account may process a database query or statement using data shared by a provider account and a second virtual warehouse for a second account may process a database query or statement using the shared data of the provider account.

Figure 4:
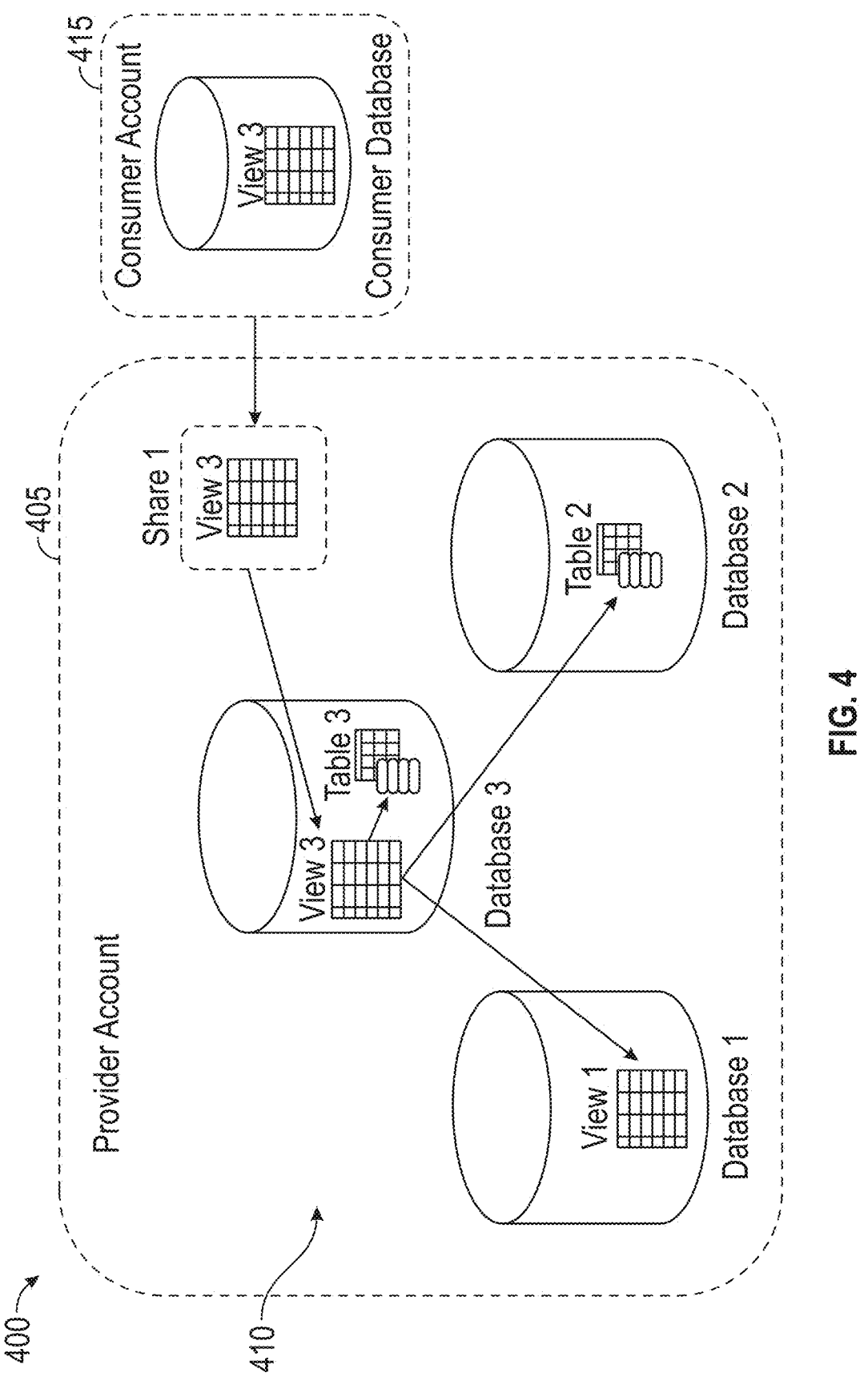
FIG. 4 shows an example database architecture for sharing data between entities (e.g., accounts, users) using the computing environment, in accordance with some embodiments of the present disclosure.

FIG. 4 shows an example database architecture 400 for sharing data between entities (e.g., accounts, users) using the computing environment 100, according to some example embodiments. In the example displayed, a data provider account 405 corresponds to a first user at a first company, department, etc., that creates and stores data) logged in as an administrator of the data 410. For instance, provider account 405 generates and stores the data in the computing environment 100. The data 410 can include data that is uploaded to the cloud data platform 102. The consumer account 415 corresponds to a user device of another user (e.g., another user at another company, different department within the same company, etc.,) with which the provider account 405 seeks to share the data 410 via the computing environment 100. For example, data provider account 405 and data consumer account 415 can both be run from different remote computing devices that can access, modify or otherwise process data 410 using cloud data platform 102 (e.g., based on permissions, roles, session information managed by share manager 109 (e.g., access management system). In the illustrated example, the data 410 includes databases (e.g., database1, database2, database3). Each database consists of one or more schemes, which are groups of database objects, such as tables (e.g., table2, table3), views (e.g., view1, view3), and shares (e.g., share1).

A view is a database object that displays data from one or more tables (e.g., displaying certain columns, with a customized view schema). A view allows the result of a query to be accessed as if the view is itself a table. A share is an object that is custom to the computing environment 100 that can be used to share data between users of the cloud data platform 102 in an efficient and secure manner. A share object comprises all information used to share a given database. Each share includes privileges that grant access to the databases and schema containing the objects to share, the privileges that grant access to specific objects (e.g., tables, secure views), and the consumer accounts with which the database and its objects are shared. After a given database is created (e.g., by data provider account 405) the shared objects can be made available for access and/or manipulation by other users (e.g., the consumer account 415) via data storage 104. For example, the provider account 405 can create one or more database instances and then load the data 410 into the database instances, create views and/or shared objects, and further create consumer accounts (e.g., reader accounts) that can access the database objects via the cloud data platform 102, and no data needs to be transferred between the accounts; instead, the shared data is accessed directly on the originating storage device. For instance, the consumer account 415 can login using a browser to access a page, generate a read-only database (e.g., "consumerDatabase"), and populate the shared data (e.g., "view3") in the database for analysis without having to copy data from the storage device that stores the shared data.

Some embodiments of the disclosure enable cross-account data sharing using secure views. A view may be defined as a secure view when it is specifically designated for data privacy or to limit access to data that should not be exposed to all accounts of the underlying table. Data might be exposed in a secure view when, for example, an account has access to only a subset of data. Secure views permit a database account to expose a restricted data set to other accounts or users without the possibility of the underlying, unrestricted data being exposed to those other accounts or users. In some embodiments, a provider account can authorize cross-account access to its data to a consumer account. The provider account may limit the receiver account to viewing only certain data and may restrict the consumer account from viewing any underlying organization schema or statistics about the data.

In some embodiments, a secure view provides several security guarantees when compared against a regular view. The secure view does not expose the view definition to non-owners of the view. This impacts various operations that access the data dictionary. In some embodiments the secure view does not expose information about any underlying data of the view, including the amount of data processed by the view, the tables accessed by the view, and so forth. This impacts the statistics that are displayed about the number of bytes and partitions scanned in a query, and what is displayed in the query profile for a query referring to a secure view. In some embodiments, the secure view does not expose data from tables accessed by the view which is filtered out by the view. In such embodiments, a client account associated with a non-secure view may access data that would be filtered out by taking advantage of query optimizations that may cause user expressions to be evaluated before security expressions (e.g. filters and joints). In such an embodiment, to achieve this requirement, the set of query optimizations that can be applied to a query containing a secure view may be restricted to guarantee that the user expressions that can leak data are not evaluated before the view is filtered.

Figure 5:
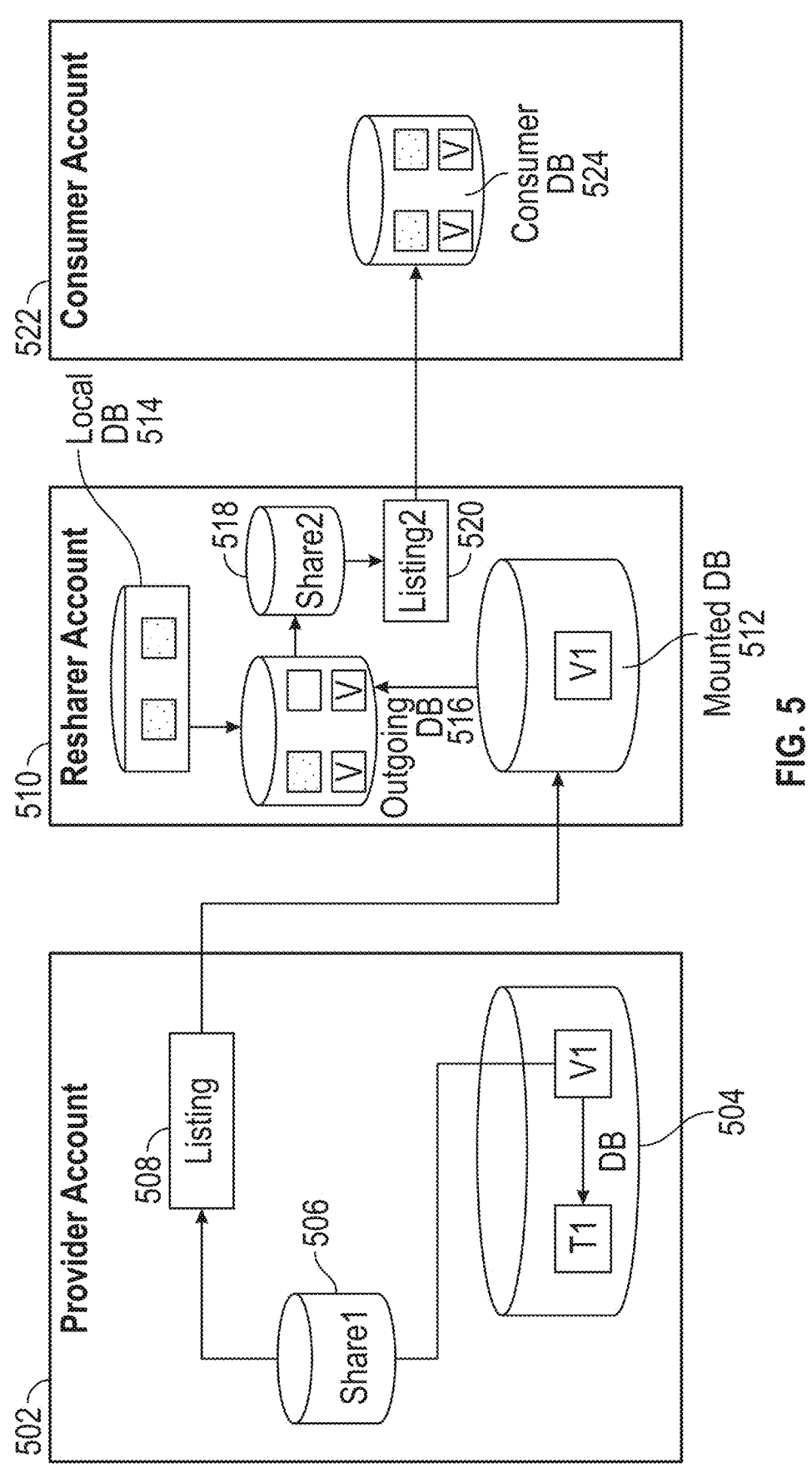
FIG. 5 illustrates an example architecture for resharing data across accounts in a multi-tenant cloud platform, in accordance with some embodiments of the present disclosure.

FIG. 5 illustrates an example architecture for resharing data across accounts in a multi-tenant cloud platform, in accordance with some embodiments of the present disclosure. FIG. 5 demonstrates the flow of data from a provider account 502 to a resharer account 510 and subsequently to a consumer account 522, all provided in the multi-tenant cloud platform.

The provider account 502 is the originator of the data to be shared. The provider account 502 includes a database (DB) 504 storing original data objects, such as tables (e.g., T1) and views (e.g., V1). In this example, the provider account 502 may wish to share view V1. V1 may be a regular view or secure view.

The provider account 502 creates a share object (Share1) 506 for V1 to enable data sharing. The share object 506 is associated with a listing (Listing2) 508, which acts as a metadata container defining the shared data and its access and resharing permissions. The listing 508 is published to make the shared data (e.g., V1) accessible to other accounts. The listing 508 may include information for whether the shared data (e.g., V1) can be reshared. For example, a resharing field or flag may be set to true if resharing is to be permitted. The listing 508 may also include information about with which accounts the shared data can be reshared and other resharing control information, such as whether the resharing is only controlled within a consumer organization.

The resharer account 510 consumes the shared data (e.g., listing 508) from the provider account 502 and enables further resharing. The resharer account 510 creates a mounted DB 512 (also referred to as an imported DB) that references the shared data (e.g., V1) from the provider account 502 without materializing the shared data. For example, the mounted DB 512 serves as a virtual representation of the shared data (e.g., V1) stored in the provider account 502. In some examples, the resharer account 510 may be restricted from modifying the mounted DB 512.

The resharer account 510 may also include a local DB 514, which stores data originating from the resharer account 510. For example, the local DB 514 may include local datasets, such as tables, functions, etc., originating from the resharer account 510. The resharer account 510 may enrich the shared data (e.g., V1) from the provider account 502 using data from the local DB 514. For example, the resharer account may apply functions or combine data from the local DB 514 to the shared data to generate enriched or transformed data, such as aggregations, reports, analytics, etc. The enriched or transformed data may be stored in an outgoing DB 516. For example, the outgoing DB 516 may include views, such as secure views, that apply transformation, filters, or joins with local data sets and the shared data.

In this example, the resharer account 510 may wish to share the enriched or transformed data. The enriched data may include one or more secure views. The resharer account 510 creates a new share object (Share2) 518 and associated listing (Listing2) 520 to share the enriched data with downstream accounts. The listing 520 is published to make the shared data (e.g., enriched data) accessible to other accounts. The listing 520 may include information for whether the shared data (e.g., enriched data) can be reshared. For example, a resharing field or flag may be set to true if resharing is to be permitted. The listing 520 may also include information about with which accounts the shared data can be reshared.

The consumer account 522 consumes the shared data (e.g., listing 520) from the resharer account 510. The consumer account 522 creates a consumer DB 524 (also referred to as an imported DB) that references the shared data (e.g., enriched data) from the resharer account 510 without materializing the shared data. For example, the consumer DB 524 serves as a virtual representation of the enriched data stored in the resharer account 510, which in turn includes a virtual representation of the original shared data (e.g., V1) stored in the provider account 502.

Reference usage grants are not required on the imported databases (e.g., mounted DB 512, consumer DB 524) with resharing enabled. The reference usage is checked when resolving the view that uses the imported databases from listings allowed for resharing. For example, the consumer account 522 may query the shared data and usage grants are referenced during query resolutions. The queries may be executed using policies and privacy settings of the original provider account 502 for data that originated from the original shared data (e.g., V1) and policies and privacy settings of the resharer account 510 for data that originated from the resharer account 510.

Compliance with governance policies and privacy settings is performed during query resolution. When a consumer queries reshared data, the system resolves the query by traversing the chain of references back to the original data shared by the provider. During this process, the system checks the resharing permissions and governance policies at each level to verify that the query adheres to the provider's restrictions. If any policy violations are detected, the query fails ensuring that resharing activities remain compliant with the provider's intent and regulatory requirements. In some examples, the system logs the failure for auditing purposes, as described in further detail below.

The architecture, as described herein, supports multi-level resharing, allowing the resharer account 510 to enrich or transform the incoming data before sharing the data further with downstream accounts. The architecture ensures that resharing adheres to governance policies and privacy settings of the original source of the data regardless of the intermediaries. The architecture provides a structured mechanism for managing access permissions and tracking resharing activities while reducing operational complexity and storage costs.

Figure 6:
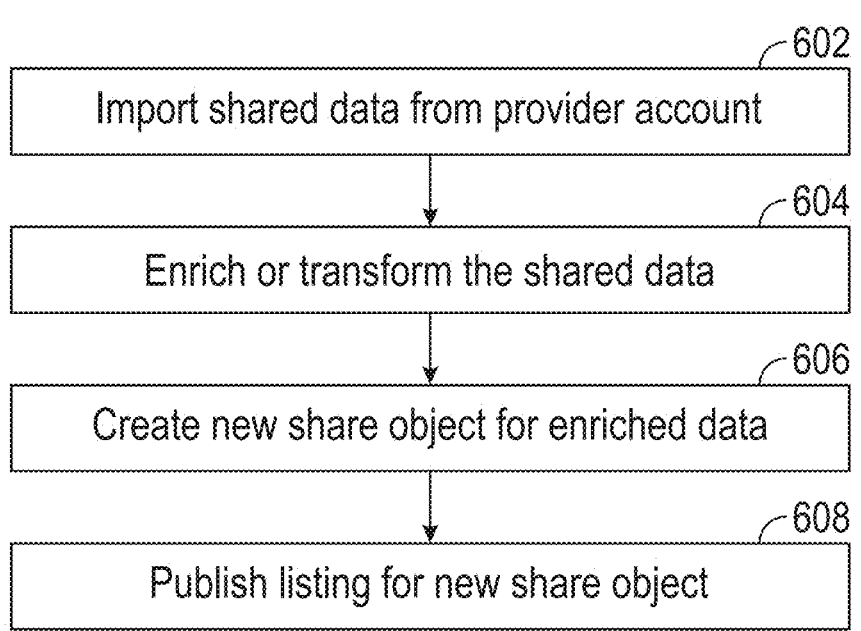
FIG. 6 is a flow diagram of a method for resharing data in a multi-tenant cloud data platform, in accordance with some embodiments of the present disclosure.

The resharer account facilitates the resharing of data received from a provider account and enables downstream consumers to access enriched or transformed datasets. FIG. 6 is a flow diagram of a method 600 for resharing data in a multi-tenant cloud data platform, in accordance with some embodiments of the present disclosure. In some examples, the method 600 may be executed by the resharer account 510 as described above with reference to FIG. 5.

At operation 602, the resharer account imports shared data from a provider account. The listing for the shared object may include grants and privileges related to accessing and resharing capabilities. For example, the grants may specify who can access the shared data and whether the shared data can be reshared and with which accounts. The resharer account may create an imported DB based on the access grants for importing a virtual representation of the shared data from the provider account, thus eliminating the need for materialization. The shared data, for example, may include a secure view of table data of the provider account. In some examples, the resharer account or any downstream consumer account may be restricted from modifying the imported DB. The imported DB may have only read-only permissions. The resharer account may give other roles read access.

At operation 604, the resharer account enriches or transforms the shared data. Enrichment may include adding computed columns, applying filters, or joining the shared data with local datasets. The resharer account may also apply additional policies (e.g., row access/masking policies) to the shared data. The resharer account, however, may not be able to grant access to data for which the resharer account was not granted access. As described in further detail below, the downstream consumer account will have access to an intersection of what the original provider granted to the resharer account and what the resharer account grants to the downstream consumer account.

The enriched data may be stored in the resharer account. In some examples, the enriched data may be stored in a separate database than the local database for the local dataset and the imported database for the shared data. The enriched data may be provided in a view, such as a secure view.

At operation 606, the resharer account may create a new share object for the enriched data to enable sharing of the enriched data. In some examples, the enriched data may include a combination of local data of the resharer account and the shared data from the provider account.

At operation 608, the resharer account publishes a listing for the new shared object. The listing includes metadata that defines the reshared data and its access and resharing permissions.

Consumer accounts may then be able to import the new shared object, which includes the original shared data from the provider account. Consumer accounts may have access to what the original provider account granted and to what the resharer account granted. For example, the grants from original provider are "ANDed" with the grants from the resharer account to the consumer account. The consumer account may then be able to query the shared data, and the queries may be executed using policies and privacy settings of the original provider account for data that originated from the original shared data and policies and privacy settings of the resharer account for data that originated from the resharer account.

As mentioned above, the resharer account may combine and transform shared data from multiple providers and share the enriched data with multiple consumer accounts. For example, a resharer account may incorporate data from multiple vendors to share with customers of the resharer account. In some examples, multiple provider accounts may contribute data to a resharer account, which is then reshared and packaged up with an application layer (code) and policies that are applied as the data gets shared. In some examples, the original provider may also be a downstream customer of the resharer account. Here, the resharer account may share the enriched data back to the provider for different applications, such as providing enriched usage or analysis information back to the provider.

Figure 7:
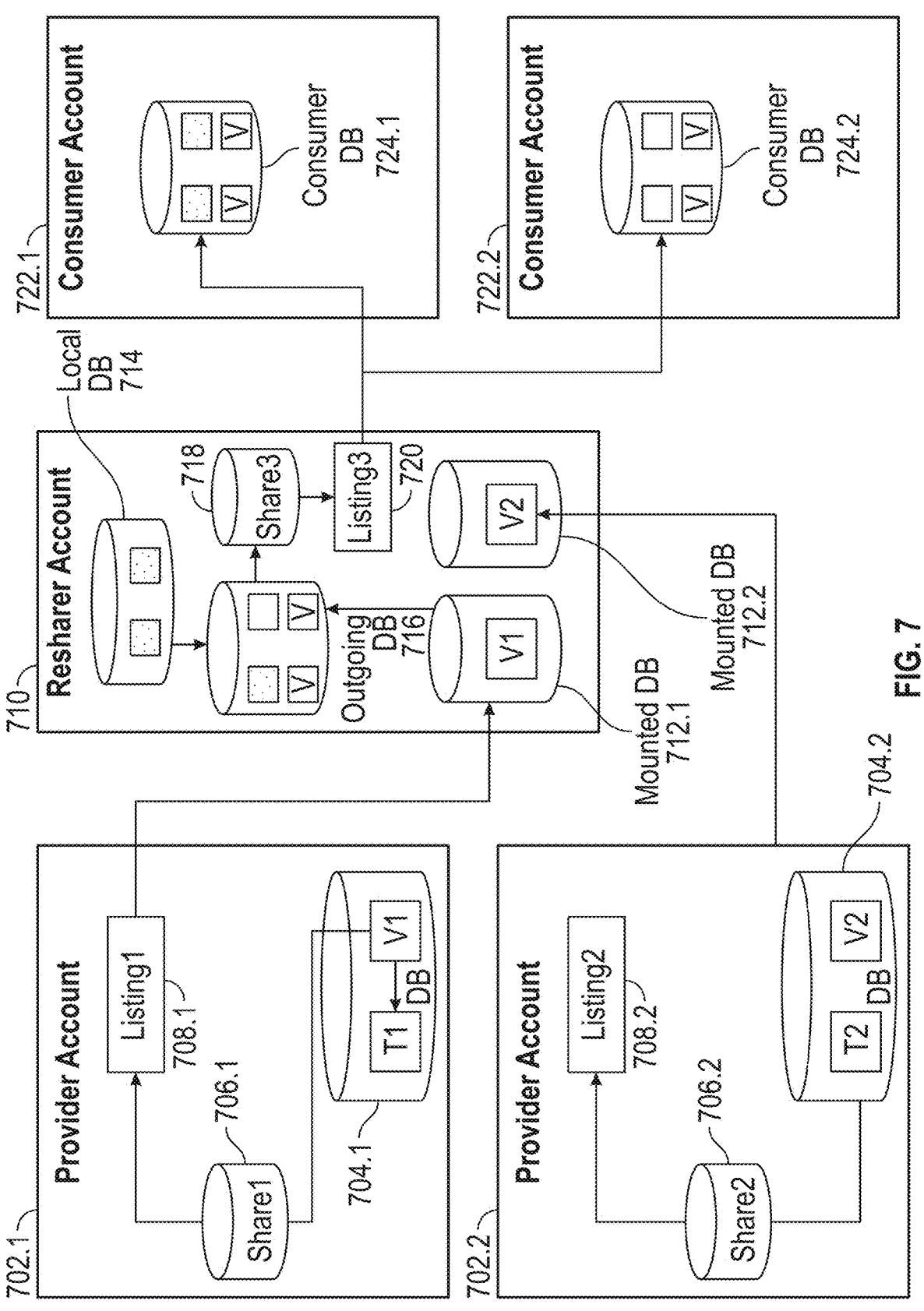
FIG. 7 illustrates an example architecture for resharing data from multiple accounts and across accounts in a multi-tenant cloud platform, in accordance with some embodiments of the present disclosure.

FIG. 7 illustrates an example architecture for resharing data from multiple accounts and across accounts in a multi-tenant cloud platform, in accordance with some embodiments of the present disclosure. FIG. 7 demonstrates the flow of data from a plurality of provider accounts (provider account 702.1, 702.2) to a resharer account 710 and subsequently to a plurality of consumer accounts (consumer account 722.1, 722.2), all provided in the multi-tenant cloud platform.

The provider account 702.1 is the originator of a first set of data to be shared. The provider account 702.1 includes a database (DB) 704.1 storing original data objects, such as tables (e.g., T1) and views (e.g., V1). In this example, the provider account 702.1 may wish to share view V1.

The provider account 702.1 creates a share object (Share1) 706.1 for V1 to enable data sharing. The share object 706.1 is associated with a listing (Listing1) 708.1, which acts as a metadata container defining the shared data and its access permissions. The listing 708.1 is published to make the first set of shared data (e.g., V1) accessible to other accounts. The listing 708.1 may include information for whether the first set of shared data (e.g., V1) can be reshared. For example, a resharing field or flag may be set to true if resharing is to be permitted. The listing 708.1 may also include information about with which accounts the first set of shared data can be reshared.

Likewise, the provider account 702.2 is the originator of a second set of data to be shared. The provider account 702.2 includes a database (DB) 704.2 storing original data objects, such as tables (e.g., T2) and views (e.g., V2). In this example, the provider account 702.2 may wish to share view V2.

The provider account 702.2 creates a share object (Share2) 706.2 for V2 to enable data sharing. The share object 706.2 is associated with a listing (Listing2) 708.2, which acts as a metadata container defining the shared data and its access permissions. The listing 708.2 is published to make the first set of shared data (e.g., V1) accessible to other accounts. The listing 708.2 may include information for whether the second set of shared data (e.g., V2) can be reshared. For example, a resharing field or flag may be set to true if resharing is to be permitted. The listing 708.2 may also include information about with which accounts the second set of shared data can be reshared.

The resharer account 710 consumes the first set of shared data (e.g., listing 708.1) from the provider account 702.1 and the second set of share data (e.g., listing 708.2) from the provider account 702.2 and enables further resharing. For example, the resharer account 710 creates a first mounted database 712.1 (also referred to as an imported database) that references the first set of shared data (e.g., V1) from the provider account 702.1 without materializing the shared data. The resharer account 710 creates a second mounted database 712.2 that references the second set of shared data (e.g., V2) from the provider account 702.1 without materializing the shared data. The mounted database 712.1, 712.2 serve as a virtual representation of the shared data (e.g., V1, V2) stored in the respective provider account 702.1, 702.2. In some examples, the resharer account 710 may be restricted from modifying the mounted databases 712.1, 712.2.

The resharer account 710 may also include a local DB 714, which stores data originating from the resharer account 510. For example, the local DB 714 may include tables, functions, etc., originating from the resharer account 710. The resharer account 710 may enrich the first set and second set of shared data (e.g., V1, V2) from the provider accounts 702.1, 702.2 using data from the local DB 714. For example, the resharer account 710 may apply functions or combine data from the local DB 714 to the first set and second set of shared data to generate enriched or transformed data, such as reports, analytics, etc. The enriched or transformed data may be stored in an outgoing DB 716. For example, the outgoing DB 716 may include views, such as secure views, that apply transformation, filters, or joins with local data sets and the first set and second set of shared data.

In this example, the resharer account 710 may wish to share the enriched or transformed data. The resharer account 710 creates a new share object (Share3) 718 and associated listing (Listing3) 720 to share the enriched or transformed data with downstream accounts. The listing 720 is published to make the shared data (e.g., enriched or transformed data) accessible to other accounts. The listing 720 may include information for whether the shared data (e.g., enriched data) can be reshared. For example, a resharing field or flag may be set to true if resharing is to be permitted. The listing 720 may also include information about with which accounts the shared data can be reshared.

The consumer account 722.1 consumes the shared data (e.g., listing 720) from the resharer account 710. The consumer account 722.1 creates a consumer DB 724.1 (also referred to as an imported DB) that references the shared data (e.g., enriched or transformed data) from the resharer account 710 without materializing the shared data. For example, the consumer DB 724.1 serves as a virtual representation of the enriched data stored in the resharer account 710, which in turn includes a virtual representation of the original shared data (e.g., V1, V2) stored in the respective provider accounts 702.1, 702.2.

In this example, consumer account 722.2 also consumes the shared data (e.g., listing 720) from the resharer account 710. The consumer account 722.2 creates a consumer DB 724.2 (also referred to as an imported DB) that references the shared data (e.g., enriched or transformed data) from the resharer account 710 without materializing the shared data. For example, the consumer DB 724.2 serves as a virtual representation of the enriched data stored in the resharer account 710, which in turn includes a representation of the original shared data (e.g., V1, V2) stored in the respective provider accounts 702.1, 702.2.

As described herein, data can be reshared across regions or deployments of the cloud data platform. For example, the provider account may be located in a first region (e.g., east region of the United States) and the resharer account and final downstream consumer accounts may be located in a different second region (e.g., west region of the United States). In this example, each respective region corresponds to a different deployment of the cloud data platform.

A Secure Share Area (SSA) is a specialized account or infrastructure within the cloud platform that facilitates cross-region (or cross-deployment) resharing by securely replicating data and metadata between regions. When resharing data across regions (or deployments), the provider data to be shared is replicated to an SSA account in the target region. The replication ensures that both the share object and the associated data are securely replicated to the SSA account. Subsequent sharing and resharing in the target region can then refer to the replicated data in the SSA account without further materialization.

Figure 8:
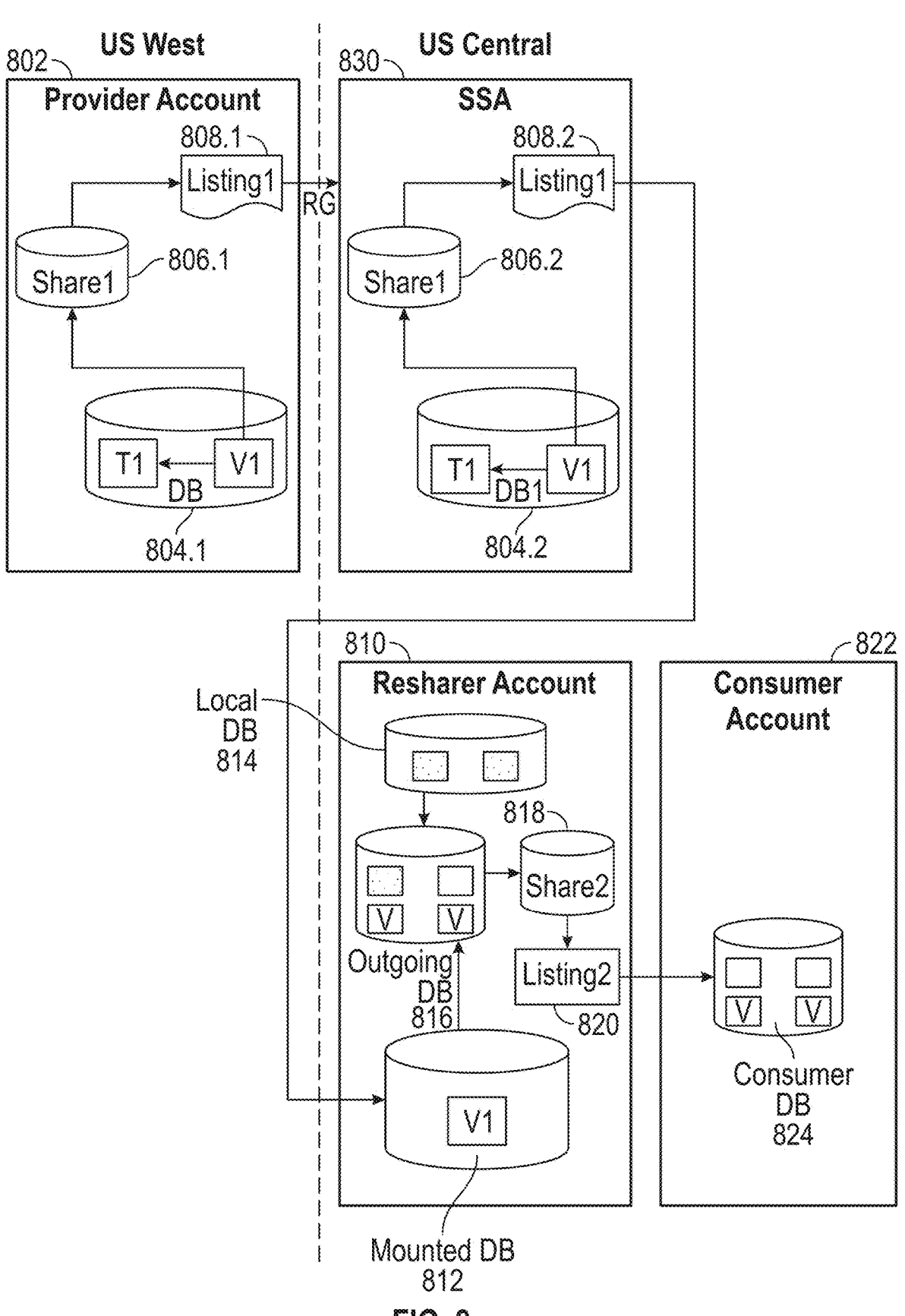
FIG. 8 illustrates an example architecture for resharing data across accounts in different regions of a multi-tenant cloud platform, in accordance with some embodiments of the present disclosure.

FIG. 8 illustrates an example architecture for resharing data across accounts in different regions of a multi-tenant cloud platform, in accordance with some embodiments of the present disclosure. FIG. 8 demonstrates the flow of data from a provider account 802 in a first region to a resharer account 810 and subsequently to a consumer account 822 in a second region, all provided in the multi-tenant cloud platform.

The provider account 802 is the originator of the data to be shared. The provider account 802 includes a database (DB) 804.1 storing original data objects, such as tables (e.g., T1) and views (e.g., V1). In this example, the provider account 802 may wish to share view V1. Also in this example, the provider account is provided in a first region (e.g., US west).

The provider account 802 creates a share object (Share1) 806.1 for V1 to enable data sharing. The share object 806.1 is associated with a listing (Listing1) 808.1, which acts as a metadata container defining the shared data and its access permissions. The listing 808.1 is published to make the shared data (e.g., V1) accessible to other accounts. The listing 808.1 may include information for whether the shared data (e.g., V1) can be reshared. For example, a resharing field or flag may be set to true if resharing is to be permitted. The listing 808.1 may also include information about with which accounts the shared data can be reshared.

In this example, the resharer account 810 and consumer account 822 are located in a second region (e.g., US central). Hence, the resharer account 810 and consumer account 822 are provided in different deployments of the cloud data platform. To facilitate resharing across regions, a SSA 830 is created in the second region. The SSA 830 includes replicated copies of data in the provider account 802. For example, a replication task (e.g., replication group) is used to replicate data in the provider account 802 and store a copy of the replicated data in the SSA 830. Thus, in this example, the SSA 830 includes a replicated DB 804.2, which includes replicated data objects, such as tables (e.g., T1) and views (e.g., V1) from the provider account 802. The SSA 830 also includes replicated copies of the share object (Share1) 806.2 and listing (Listing1) 808.2. The replicated data in the SSA

830 serves as the source reference point for subsequent sharing and resharing in the second region.

The resharer account 810 consumes the shared data (e.g., listing 508.2) from the SSA 830 and enables further resharing. The resharer account 810 creates a mounted database 812 (also referred to as an imported database) that references the shared data (e.g., V1) from the SSA 830 without further materializing the shared data. For example, the mounted database 812 serves as a virtual representation of the shared data (e.g., V1) stored in the SSA 830. In some examples, the resharer account 810 may be restricted from modifying the mounted database 812.

The resharer account 810 may also include a local DB 814, which stores data originating from the resharer account 810. For example, the local DB 814 may include tables, functions, etc., originating from the resharer account 810. The resharer account 810 may enrich the shared data (e.g., V1) from the mounted database 812 using data from the local DB 814. For example, the resharer account 810 may apply functions or combine data from the local DB 814 to the shared data to generate enriched or transformed data, such as reports, analytics, etc. The enriched or transformed data may be stored in an outgoing DB 816. For example, the outgoing DB 816 may include views, such as secure views, that apply transformation, filters, or joins with local data sets and the shared data.

In this example, the resharer account 810 may wish to share the enriched or transformed data. The resharer account 810 creates a new share object (Share2) 818 and associated listing (Listing2) 820 to share the enriched or transformed data with downstream accounts. The listing 820 is published to make the shared data (e.g., enriched or transformed data) accessible to other accounts. The listing 820 may include information for whether the shared data (e.g., enriched data) can be reshared. For example, a resharing field or flag may be set to true if resharing is to be permitted. The listing 820 may also include information about with which accounts the shared data can be reshared.

The consumer account 822 consumes the shared data (e.g., 820) from the resharer account 810. The consumer account 822 creates a consumer DB 824 (also referred to as an imported DB) that references the shared data (e.g., enriched or transformed data) from the resharer account 810 without materializing the shared data. For example, the consumer DB 824 serves as a virtual representation of the enriched data stored in the resharer account 810, which in turn includes a virtual representation of the original shared data (e.g., V1) stored in the SSA 830.

The cloud data platform may include a monitoring mechanism for resharing activity. Monitoring resharing activity can ensure governance, compliance, and operational efficiency in multi-tenant cloud platforms. For example, the system ensures that resharing adheres to the original provider's policies, such as row access controls, masking policies, and data locality restrictions.

As data flows from provider accounts to resharer accounts and subsequently to consumer accounts, the cloud data platform can track and analyze resharing activities to maintain visibility, enforce policies, and prevent unauthorized data propagation. The system may provide audit logs that document resharing activities, enabling providers to demonstrate compliance with regulatory requirements and internal policies. For example, anytime a database is created from a listing allowed for resharing, a listing consumption event may be reported as a reshare event. The number of reshare events may be reported to the provider. The monitoring mechanisms described herein provide providers and resharers with actionable insights into resharing operations while safeguarding the integrity of shared datasets.

Providers can specify restrictions on resharing, such as limiting resharing to specific accounts or regions, and the system enforces these restrictions during query resolution, as described above. Providers can retain control over their shared data by monitoring the number of downstream reshares and the accounts involved in resharing. Each time a resharer creates a new listing or share object based on the share data, the system logs this activity and associates the activity with the original listing. Providers can access analytics dashboards that display metrics such as the number of resharers, the frequency of resharing, and the types of transformations applied to the data. This visibility allows providers to evaluate the impact of their shared data, identify high-value resharers, and enforce restrictions on resharing permissions when necessary.

In some examples, resharers are notified when their reshared listings are disrupted due to changes in the governance policies or resharing permissions of the original provider. For example, if the provider revokes the allow-resharing property on a listing or modifies the underlying data governance policies, the system alerts the resharer about the potential impact on their outgoing listings. These notifications enable resharers to take corrective actions, such as updating their secure views or informing downstream consumers about the disruption. Additionally, resharers can monitor the health of their reshared listings to ensure that queries from consumer accounts are executed without errors.

The system can also track query resolution across the resharing chain to ensure compliance with governance policies and privacy settings. When a consumer queries reshared data, the system resolves the query by traversing the chain of references back to the original provider's data. During this process, the system checks the resharing permissions and governance policies at each level to verify that the query adheres to the provider's restrictions. If any policy violations are detected, the query fails, and the system logs the failure for auditing purposes. This tracking mechanism ensures that resharing activities remain compliant with the provider's intent and regulatory requirements.

The system can also use analytic tools to analyze resharing information. Advanced analytics tools provide insights into the impact of resharing on data usage and collaboration. Providers and resharers can analyze trends in resharing activity, such as the growth of downstream consumer accounts, the geographic distribution of reshared data, and the types of transformations applied to the data. These analytics help stakeholders optimize their resharing strategies, identify opportunities for monetization, and improve the efficiency of data collaboration. For example, providers can use resharing metrics to negotiate higher-tier contracts with resharers who generate significant downstream activity.

Effective monitoring of resharing activity can empower providers and resharers to maintain control over shared data, optimize collaboration, and ensure compliance with governance policies. By providing visibility, notifications, query tracking, and analytics, the system transforms resharing into a secure, efficient, and transparent process that benefits stakeholders in the multi-tenant cloud platform.

In view of the disclosure above, various examples are set forth below. It should be noted that one or more features of an example, taken in isolation or combination, should be considered within the disclosure of this application.

Example 1. A method comprising: receiving, by a resharer account of a multi-tenant data system, a first listing for a first set of data shared by a provider account of the multi-tenant data system, the listing defining an access grant and a resharing grant for the first set of data; creating, by the resharer account, a first database in the resharer account, the first database comprising virtual representations of the first set of data; transforming, by the resharer account, the first set of data to generate a second set of data; storing, by the resharer account, the second set of data in a second database in the resharer account, the second set of data comprising at least one virtual representation of the first set of data; and publishing, by the resharer account, a second listing of the second set of data to share with a consumer account based on the resharing grant for the first set of data in the first listing.

Example 2. The method of example 1, wherein the first database references the first set of data without materializing the first set of data in the resharer account.

Example 3. The method of any of examples 1-2, wherein the resharer account is restricted from modifying the first database.

Example 4. The method of any of examples 1-3, wherein the consumer account is configured to create a consumer database in the consumer account, the consumer database comprising virtual representations of the second set of data including at least one virtual representation of the first set of data without materializing the first set of data and the second set of data in the consumer account.

Example 5. The method of any of examples 1-4, wherein the provider account is a first provider account, the method comprising: receiving, by the resharer account, a third listing of a third set of data shared by a second provider account; and creating, by the resharer account, a third database in the resharer account comprising virtual representations of the third set of data.

Example 6. The method of any of examples 1-5, wherein transforming comprises combining at least a portion of the first set of data from the first provider account and at least a portion of the third set of data from the second provider account.

Example 7. The method of any of examples 1-6, further comprising: receiving, from the consumer account, a query referencing the second set of data; and enforcing governance policies of the provider account for the at least one virtual representation of the first set of data in the second set of data during query resolution.

Example 8. The method of any of examples 1-7, wherein the provider account, the resharer account, and the consumer account are provided in a single deployment of the multi-tenant data system.

Example 9. The method of any of examples 1-8, wherein the provider account is provided in a first deployment of the multi-tenant data system and the resharer account is provided in a second deployment of the multi-tenant data system, the method further comprising: saving, by a sharing account in the second deployment, replicated copies of the first listing and the first set of data, wherein the virtual representations in the resharer account are of the replicated copies stored in the sharing account.

Example 10. A system comprising: one or more processors of a machine; and a memory storing instructions that, when executed by the one or more processors, cause the machine to perform operations implementing any one of example methods 1 to 9.

Example 11. A machine-storage medium embodying instructions that, when executed by a machine, cause the machine to perform operations implementing any one of example methods 1 to 9.

Figure 9:
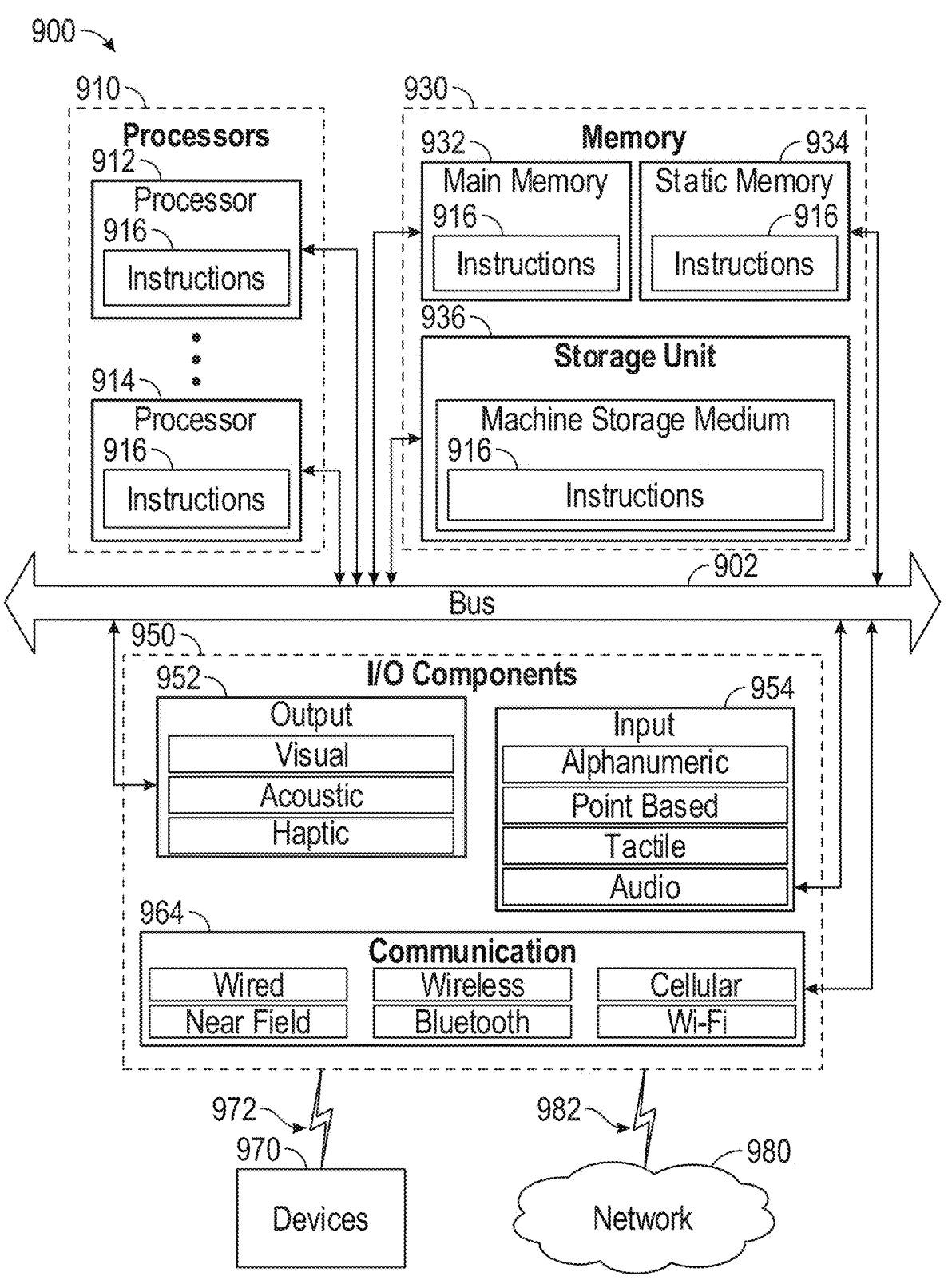
FIG. 9 illustrates a diagrammatic representation of a machine in the form of a computer system within which a set of instructions may be executed for causing the machine to perform any one or more of the methodologies discussed herein, in accordance with some embodiments of the present disclosure.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., a software, a program, an application, an applet, an app, or other executable code) for causing the machine 900 to perform any one or more of the methodologies discussed herein may be executed. For example, the instructions 916 may cause the machine 900 to execute any one or more operations of the method described herein. As another example, the instructions 916 may cause the machine 900 to implement any one or more portions of the functionality illustrated in any one of FIGS. 1, 2, 5, 7, and 8. In this way, the instructions 916 transform a general, non-programmed machine into a particular machine that is specially configured to carry out any one of the described and illustrated functions of the cloud data platform 102 such as the compute service manager 108 (or a component thereof such as the share manager 109) or an execution node of the execution platform 110.

In some embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 includes processors 910, memory 930, and I/O components 950 configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 914 and a processor 912 that may execute the instructions 916. The term "processor" is intended to include multi-core processors 910 that may comprise two or more independent processors (sometimes referred to as "cores") that may execute instructions 916 contemporaneously. Although FIG. 9 shows multiple processors 910, the machine 900 may include a single processor with a single core, a single processor with multiple cores (e.g., a multi-core processor), multiple processors with a single core, multiple processors with multiple cores, or any combination thereof.

The memory 930 may include a main memory 932, a static memory 934, and a storage unit 936, all accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 include components to receive input, provide output, produce output, transmit information, exchange information, capture measurements, and so on. The specific I/O components 950 that are included in a particular machine 900 will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, and other communication components to provide communication via other modalities. The devices 970 may be another machine or any of a wide variety of peripheral devices (e.g., a peripheral device coupled via a universal serial bus (USB)). For example, as noted above, the machine 900 may correspond to any one of the compute service manager 108, the execution platform 110, and the devices 970 may include the data store 206 or any other computing device described herein as being in communication with the cloud data platform 102 or the data storage 104.

The various memories (e.g., 930, 932, 934, and/or memory of the processor(s) 910 and/or the storage unit 936) may store one or more sets of instructions 916 and data structures (e.g., software) embodying or utilized by any one or more of the methodologies or functions described herein. These instructions 916, when executed by the processor(s) 910, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage medium," "computer-storage medium," and "device-storage medium" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor implemented. For example, at least some of the operations of the method 600 may be performed by one or more processors. The performance of certain of the operations may be distributed among the one or more processors, not only residing within a single machine, but also deployed across a number of machines. In some example embodiments, the processor or processors may be in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Thus, although specific embodiments have been illustrated and described herein, it should be appreciated that any arrangement calculated to achieve the same purpose may be substituted for the specific embodiments shown. This disclosure is intended to cover all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
at least one hardware processor; and
at least one memory storing instructions that cause the at least one hardware processor to perform operations comprising:
receiving, by a resharer account of a multi-tenant data system, a first listing for a first set of data shared by a provider account of the multi-tenant data system, the listing defining an access grant and a resharing grant for the first set of data;
creating, by the resharer account, a first database in the resharer account, the first database comprising virtual representations of the first set of data;
transforming, by the resharer account, the first set of data to generate a second set of data;
storing, by the resharer account, the second set of data in a second database in the resharer account, the second set of data comprising at least one virtual representation of the first set of data; and
publishing, by the resharer account, a second listing of the second set of data to share with a consumer account based on the resharing grant for the first set of data in the first listing.

2. The system of claim 1, wherein the first database references the first set of data without materializing the first set of data in the resharer account.

3. The system of claim 1, wherein the resharer account is restricted from modifying the first database.

4. The system of claim 1, wherein the consumer account is configured to create a consumer database in the consumer account, the consumer database comprising virtual representations of the second set of data including at least one virtual representation of the first set of data without materializing the first set of data and the second set of data in the consumer account.

5. The system of claim 1, wherein the provider account is a first provider account, the operations further comprising:
receiving, by the resharer account, a third listing of a third set of data shared by a second provider account; and
creating, by the resharer account, a third database in the resharer account comprising virtual representations of the third set of data.

6. The system of claim 5, wherein transforming comprises combining at least a portion of the first set of data from the first provider account and at least a portion of the third set of data from the second provider account.

7. The system of claim 1, the operations further comprising:
receiving, from the consumer account, a query referencing the second set of data; and
enforcing governance policies of the provider account for the at least one virtual representation of the first set of data in the second set of data during query resolution.

8. The system of claim 1, wherein the provider account, the resharer account, and the consumer account are provided in a single deployment of the multi-tenant data system.

9. The system of claim 1, wherein the provider account is provided in a first deployment of the multi-tenant data system and the resharer account is provided in a second deployment of the multi-tenant data system, the operations further comprising:

saving, by a sharing account in the second deployment, replicated copies of the first listing and the first set of data, wherein the virtual representations in the resharer account are of the replicated copies stored in the sharing account.

10. A method comprising:

receiving, by a resharer account of a multi-tenant data system, a first listing for a first set of data shared by a provider account of the multi-tenant data system, the listing defining an access grant and a resharing grant for the first set of data;

creating, by the resharer account, a first database in the resharer account, the first database comprising virtual representations of the first set of data;

transforming, by the resharer account, the first set of data to generate a second set of data;

storing, by the resharer account, the second set of data in a second database in the resharer account, the second set of data comprising at least one virtual representation of the first set of data; and publishing, by the resharer account, a second listing of the second set of data to share with a consumer account based on the resharing grant for the first set of data in the first listing.

11. The method of claim 10, wherein the first database references the first set of data without materializing the first set of data in the resharer account.

12. The method of claim 10, wherein the resharer account is restricted from modifying the first database.

13. The method of claim 10, wherein the consumer account is configured to create a consumer database in the consumer account, the consumer database comprising virtual representations of the second set of data including at least one virtual representation of the first set of data without materializing the first set of data and the second set of data in the consumer account.

14. The method of claim 10, wherein the provider account is a first provider account, the method comprising:

receiving, by the resharer account, a third listing of a third set of data shared by a second provider account; and creating, by the resharer account, a third database in the resharer account comprising virtual representations of the third set of data.

15. The method of claim 14, wherein transforming comprises combining at least a portion of the first set of data from the first provider account and at least a portion of the third set of data from the second provider account.

16. The method of claim 10, further comprising:

receiving, from the consumer account, a query referencing the second set of data; and enforcing governance policies of the provider account for the at least one virtual representation of the first set of data in the second set of data during query resolution.

17. The method of claim 10, wherein the provider account, the resharer account, and the consumer account are provided in a single deployment of the multi-tenant data system.

18. The method of claim 10, wherein the provider account is provided in a first deployment of the multi-tenant data system and the resharer account is provided in a second deployment of the multi-tenant data system, the method further comprising:

saving, by a sharing account in the second deployment, replicated copies of the first listing and the first set of data, wherein the virtual representations in the resharer account are of the replicated copies stored in the sharing account.

19. A machine-storage medium embodying instructions that, when executed by a machine, cause the machine to perform operations comprising:

receiving, by a resharer account of a multi-tenant data system, a first listing for a first set of data shared by a provider account of the multi-tenant data system, the listing defining an access grant and a resharing grant for the first set of data;

creating, by the resharer account, a first database in the resharer account, the first database comprising virtual representations of the first set of data;

transforming, by the resharer account, the first set of data to generate a second set of data;

storing, by the resharer account, the second set of data in a second database in the resharer account, the second set of data comprising at least one virtual representation of the first set of data; and publishing, by the resharer account, a second listing of the second set of data to share with a consumer account based on the resharing grant for the first set of data in the first listing.

20. The machine-storage medium of claim 19, wherein the first database references the first set of data without materializing the first set of data in the resharer account.

* * * * *